United States Patent
Taber, Jr. et al.

(10) Patent No.: US 11,625,759 B2
(45) Date of Patent: Apr. 11, 2023

(54) GRID-INTEGRATED ELECTRIC VEHICLE CHARGING AS A SERVICE

(71) Applicant: ENEL X S.R.L., Rome (IT)

(72) Inventors: Wm. Stevens Taber, Jr., San Anselmo, CA (US); Preston Roper, Los Altos, CA (US); Oleksandr Yegorov, San Francisco, CA (US)

(73) Assignee: Enel X Way S.R.L., Rome (IT)

(*) Notice: Subject to any disclaimer, the term of this patent is extended or adjusted under 35 U.S.C. 154(b) by 207 days.

(21) Appl. No.: 16/660,779

(22) Filed: Oct. 22, 2019

(65) Prior Publication Data
US 2021/0118070 A1  Apr. 22, 2021

(51) Int. Cl.
*G06Q 30/02* (2012.01)
*G06Q 30/0283* (2023.01)
(Continued)

(52) U.S. Cl.
CPC .......... *G06Q 30/0283* (2013.01); *B60L 53/60* (2019.02); *B60L 53/665* (2019.02);
(Continued)

(58) Field of Classification Search
CPC ......... G06Q 30/0283; G06Q 10/06315; G06Q 20/127; G06Q 20/22; G06Q 40/04; G06Q 20/145; G06Q 20/085; G06Q 30/016; G06Q 30/018; G06Q 30/0203; G06Q 50/06; G06Q 50/163; G06Q 50/26; B60L 53/60; B60L 53/665; B60L 53/67; B60L 53/68;
(Continued)

(56) References Cited

U.S. PATENT DOCUMENTS

| | | | |
|---|---|---|---|
| 2002/0120475 A1* | 8/2002 | Morimoto | B65D 23/14 705/4 |
| 2012/0013299 A1* | 1/2012 | Prosser | B60L 55/00 320/109 |

(Continued)

OTHER PUBLICATIONS

"Dubey et al. "Electric Vehicle Charging on Residential Distribution Systems: Impacts and Mitigations", IEEE, Oct. 22, 2015., https://ieeexplore.ieee.org/document/8440511" (Year: 2015).*

*Primary Examiner* — Santosh R Poudel
(74) *Attorney, Agent, or Firm* — Foley & Lardner LLP

(57) ABSTRACT

Method for managing charging service comprising independent Installers, independent utilities, independent electric charging customers, CO2 levels, and independent energy markets, the method comprising: electronically calculating cost of service on a periodic basis based on a plurality of dynamically changing influencing parameters; electronically determining a capital cost of installation; obtaining customer's zip code to determine regional variations in installation cost; estimating customer's location from customer's IP address to determine regional variations in installation cost; Soliciting information about conditions at an installation location which may affect installation cost by soliciting customer input in response to an online questionnaire; soliciting an address of the installation location, then obtaining data comprising age of a building, size of the building and number of units from publicly available data bases, to determine installation cost.

22 Claims, 1 Drawing Sheet

(51) Int. Cl.
  *G06Q 10/0631* (2023.01)
  *H02J 13/00* (2006.01)
  *G06Q 20/12* (2012.01)
  *G06Q 40/04* (2012.01)
  *B60L 53/66* (2019.01)
  *G06Q 20/22* (2012.01)
  *B60L 53/60* (2019.01)
  *B60L 53/67* (2019.01)
  *B60L 53/68* (2019.01)

(52) U.S. Cl.
  CPC ..... *G06Q 10/06315* (2013.01); *G06Q 20/127* (2013.01); *G06Q 20/22* (2013.01); *G06Q 40/04* (2013.01); *H02J 13/00002* (2020.01); *B60L 53/67* (2019.02); *B60L 53/68* (2019.02)

(58) Field of Classification Search
  CPC .... B60L 53/62; B60L 53/64; H02J 13/00002; Y02T 90/167; Y02T 10/70; Y02T 10/7072; Y02T 90/12; Y02T 90/16; Y04S 30/14; G07F 15/005; G07F 15/008
  See application file for complete search history.

(56) References Cited

U.S. PATENT DOCUMENTS

| | | | |
|---|---|---|---|
| 2015/0066442 A1* | 3/2015 | Pryor | G06F 30/20 136/251 |
| 2015/0134139 A1* | 5/2015 | Westergaard | G05B 15/02 700/295 |
| 2015/0269664 A1* | 9/2015 | Davidson | G06Q 40/00 705/35 |
| 2016/0070286 A1* | 3/2016 | Gupta | G05B 13/026 700/291 |
| 2021/0276447 A1* | 9/2021 | Kumar | B60L 53/64 |

* cited by examiner

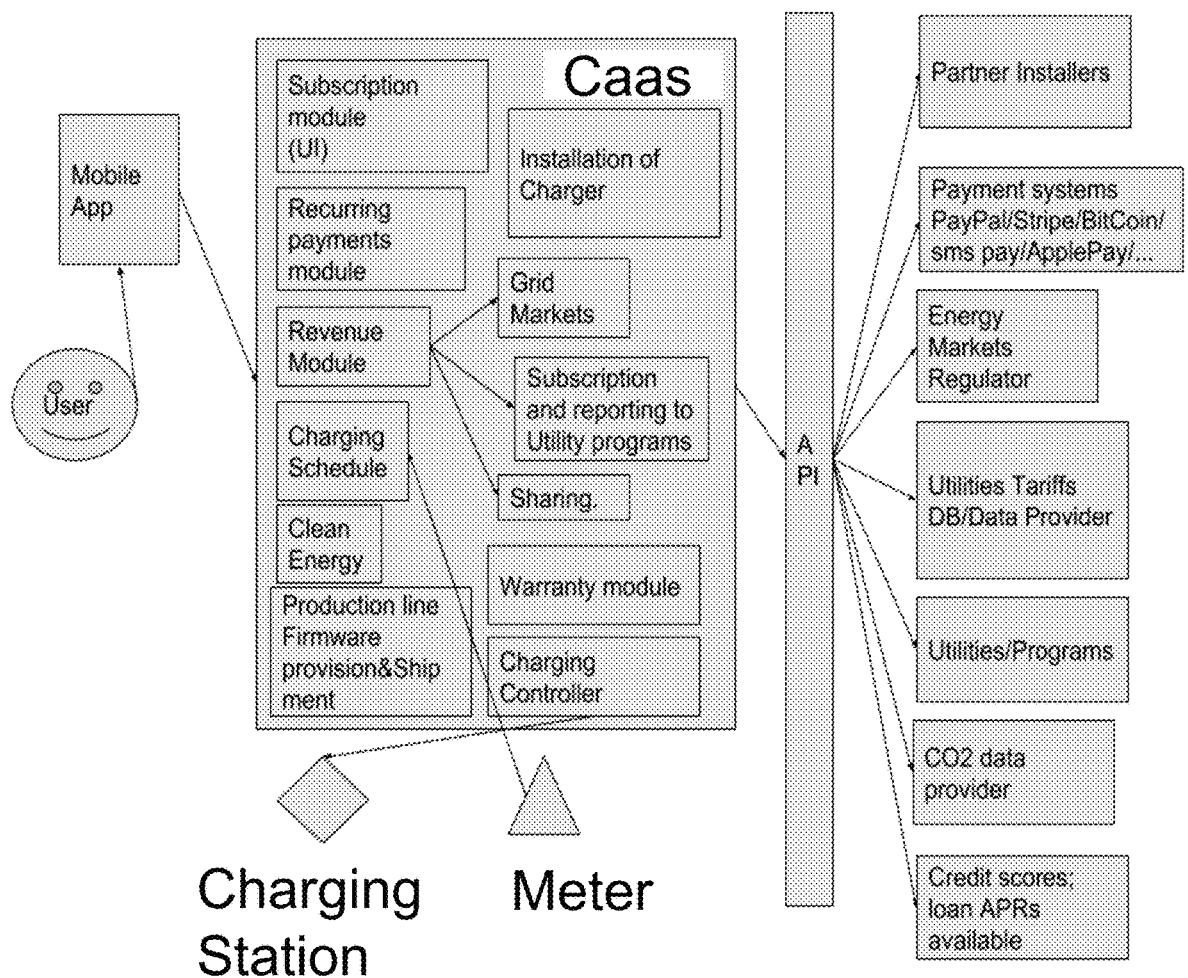

GRID-INTEGRATED ELECTRIC VEHICLE CHARGING AS A SERVICE

CROSS-REFERENCE TO RELATED PATENT APPLICATION

This regular U.S. patent application relies upon and claims the benefit of priority from U.S. provisional patent application No. 62/748,551, entitled "Grid-Integrated Electric Vehicle Charging as a Service," filed on Oct. 22, 2018, which is incorporated by reference herein in its entirety.

BACKGROUND OF THE INVENTION

Field of the Invention

The disclosed embodiments relate in general to electric vehicle charging and electric energy storage technology, and, more specifically, grid-integrated electric vehicle charging as a service.

Description of the Related Art

Purveyors of electric vehicle charging equipment ("chargers") currently offer electric vehicle charging equipment (or electric vehicle service equipment or EVSE) for sale. Some such purveyors also will bundle an EVSE with referral to a licensed electrician who will install the EVSE. Some such referrals also include a customer interface in which the cost of installation is automatically calculated as part of the referral process, based on data provided by the customer, which describes the variables at the site of the installation, which determine installation cost. Examples of such variables include the distance from the electrical panel to the installation site, the adequacy of the electric service from the utility grid to the site, and the availability of space for an additional circuit on the customer's electricity panel. The risk of variability in construction cost is mitigated by two factors: the input of data describing site variables by the customer (the "take-off risk") and by pre-negotiating the unit prices with installers (the "unit price risk"). Finally, some such purveyors are assumed to offer financing for the purchase of the EVSE and/or the installation.

SUMMARY OF THE INVENTION

The inventive methodology is directed to methods and systems that substantially obviate one or more of the above and other problems associated with conventional electric vehicle charging technology.

In accordance with one aspect of the embodiments described herein, there is provided a method for managing charging service comprising independent Installers, independent utilities, independent electric charging customers, CO2 levels, and independent energy markets, the method comprising: Electronically calculating cost of service on a periodic basis based on a plurality of dynamically changing influencing parameters; Electronically determining a capital cost of installation; Obtaining customer's zip code to determine regional variations in installation cost; Estimating customer's location from customer's IP address to determine regional variations in installation cost; Soliciting information about conditions at an installation location which may affect installation cost by soliciting customer input in response to an online questionnaire; Soliciting an address of the installation location, then obtaining data comprising age of a building, size of the building and number of units from publicly available data bases, to determine installation cost; Inferring from an age of the building an adequacy of an electrical service from an electrical grid to accommodate additional demand which will result from the installation of a charger and whether the installation of a charger will necessitate an upgrade in an electrical service from the electrical grid, a new, larger electrical panel, or both; and If the installation of a charger will necessitate an upgrade in the electrical service from the electrical grid if the charging is uncontrolled, with attendant higher installation cost, avoiding the upgrade by dispatching charging in real time only during periods when the demand elsewhere in the customer's location has abated.

In one or more embodiments, the method further comprises performing the steps a. through h. using a cloud-based platform for controlling charging.

In one or more embodiments, the method further comprises performing the steps a. through h. using a customer's WiFi connection to a cloud-based platform.

In one or more embodiments, the method further comprises performing the steps a. through h. using a cellular-based connection to a cloud-based platform.

In one or more embodiments, the method further comprises notifying customer about the scheduling behavior of the charger.

In one or more embodiments, the method further comprises advising customer about how to change the scheduling behavior of the charger.

In one or more embodiments, the method further comprises performing the steps a. through h. without overloading the electrical grid.

In one or more embodiments, the method further comprises advising customer about a possible addition of photovoltaic generation, with or without battery storage, which may mitigate a constraint of available electrical capacity.

In one or more embodiments, the method further comprises matching of installation conditions with a limited number of pre-determined sets of conditions.

In one or more embodiments, the method further comprises pre-determined installation costs that correspond to the pre-determined sets of conditions.

In one or more embodiments, the method further comprises varying the installation costs based on regional variations in overall construction costs.

In one or more embodiments, the method further comprises obtaining the identity of the customer's electric service provider by soliciting from customer through an online question or by inferring from the customer's zip code or address.

In one or more embodiments, the method further comprises determining from publicly available information the availability of subsidies or incentives from the customer's electric service provider, public agency, or other source that may be used to reduce the net installation cost.

In one or more embodiments, the method further comprises offering the customer the option of paying in full for the bundled installation cost and charger.

In one or more embodiments, the method further comprises offering the customer the option of making a periodic payment as a subscription to charging as a service, rather than paying in full.

In one or more embodiments, the method further comprises determining the amount of the periodic payment electronically, by applying an algorithm to the total bundled cost of installation and charger.

In one or more embodiments, the method further comprises adding thereto operating costs.

In one or more embodiments, the method further comprises subtracting therefrom, future revenues from the sale of electrical grid commodities, environmental attributes.

In one or more embodiments, the method further comprises providing for a manual verification of the installation conditions obtained electronically.

In one or more embodiments, the method further comprises repeating an electronic calculation loop comprising the steps a. through h. if conditions vary.

In one or more embodiments, the method further comprises electronically making receiving request to install charging station, DR event or utility program.

In one or more embodiments, the method further comprises providing an electronic access to charging and an energy schedule. In one or more embodiments, the method further comprises determining a charge for the electronic access.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 1 illustrates an exemplary embodiment of the described charging as a service system.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

In accordance with one aspect of the embodiments described herein, there is provided system and method enabling Charging as a Service (CaaS), which replaces the conventional business model described above with a service, in which the purveyor of the charging equipment offers the customer a service, which includes any or all of the following value proposition:

The purveyor provides the EVSE.

The EVSE is capable of grid-integrated EV charging, employing cloud communications and software that connects the EVSE to operation of the electric grid and for data collection and monitoring. This enables the purveyor to capture revenues from the electric grid for balancing frequency and other electric commodities. It also enable the purveyor to dispatch and curtail the customer's charging activity so as to minimize the customer's cost for charging.

The purveyor may additionally offer periodic upgrades of the EVSE to more current technology.

The customer can choose chargers from manufacturers other than the purveyor if the customer prefers, while still procuring CaaS from the purveyor, when communication is enabled on the device via the aforementioned cloud software.

The purveyor handles installation and activation of the customer's EVSE, including paying the installer.

The customer can choose his or her preferred charging level.

The customer can easily change charging level later if he or she wants to.

The purveyor enables the customer to always charge at the lowest cost of electricity that is available from his or her electric utility.

The purveyor monitors the customer's electricity use and lets him or her know if it makes sense for the customer to change to a different utility tariff.

The purveyor gives the customer real time information about the customer's carbon footprint from charging and enables the customer to optimize his or her charging to minimize it and/or to maximize his or her use of renewable energy in charging.

The purveyor offers this service for a periodic fee, typically of a fixed amount.

In one or more embodiments, with this service, the purveyor is able to offer the customer Charging as a Service on financially attractive terms because the purveyor eliminates several sources of economic inefficiency in the prior art, including the following:

customer intake and sale volume procurement of EVSEs volume procurement of installation services volume procurement of capital automation of the selling, provisioning, monitoring, and control of the stations Linking CaaS to revenue-producing grid services which subsidize CaaS expenses.

In one or more embodiments, the purveyor is able to eliminate economic inefficiency in two of these four areas (customer intake and sale and installation services) not only through economies of scale but also through a fundamental redesign of the procurement process, as described below:

Eliminated economic inefficiency in customer intake and sale. In one or more embodiments, the customer intake and sale process is fully automated, including the following:

The customer upload of data describing installation conditions at the customer's site, which enables the purveyor to calculate with substantial precision the actual cost of installation at the customer's site.

The automated interface reads the customer's location from IP data, matches it with a data base of incentives available in different geographic areas from public agencies, electric utilities, etc., netting that incentive out against the periodic fee and/or offering it to the customer as an inducement to accept the service.

Eliminated economic inefficiency in the procurement of installation services. Customer intake/sale and procurement of installation services are handled in a fully automated process described in the attached flow chart. The process eliminates the following costs for the installer:

marketing
estimating
bidding
most unproductive site visits prior to contract execution
lien filings
collection
working capital In other words, in one or more embodiments, the process enables the installer to focus almost all of his or her working hours on actual installation work, greatly increasing the efficiency of the installer's business. The purveyor of CaaS is in a position to capture some or all of these efficiencies in the purveyor's cost of sales through negotiations with or competitive bidding by the installer(s).

Furthermore, in one or more embodiments, the purveyor is able to entirely automate the process of both customer intake/sale and procurement of installation services, reducing the purveyor's cost of sales.

Furthermore, in one or more embodiments, the purveyor is able to avoid the cost of educating each retail customer on how to activate his or her EVSE.

In one or more embodiments, system automatically controlling and managing charger station live cycle starting from ordering, installing, subscription and sharing metering data with utilities/3rd parties DR events programs, continuous dynamic optimization of charging schedule, warranty cycles/replacements. Continuous charging schedule optimization taking into account—household EVs, battery sizes and average daily usage, day ahead and real time CO2 local data, energy markets data, time when EVs usually plug in and needed to be charged by, household tariff with tiers, DR events from 3rd parties as utilities, metering data for whole household, metering data for charging station, metering data and day ahead prediction for any sources of energy in household, like solar/wind/battery storage, V2G EVs. Charging schedule is dynamically updated with frequency depending on historical data and real time events for CO2 level, DR events notifications, metering, User input (car needed by a specific date and time with a predetermined number of miles available; tiers of energy can be used).

In one or more embodiments, the structure of charging as a service system is as follows. In one or more embodiments, a subscription module automatically (re)calculates monthly rate depending on one or more of the following parameters: type of EV; number of EVs; subscription duration; miles per year; % of charging at home; fixed monthly price or adjustable; user utility grid programs availability; coefficient of cleanliness of energy; carbon content of energy; utility tariff; installation conditions and cost; usage pattern (User willing to plug in EV as soon as reaching home and specify number of miles needed till next charge (plug in); user willing to install charger outside garage and share with others; user credit score.

In one or more embodiments, the installation of charger automatically defines installation price depending on user's ZIP code and user questionnaire; automatically provisions charging station (and a meter) on the production line with charging as a service firmware; automatically sends shipping label to installer/customer; automatically adds charging station to customer account (auto created when completed purchase; automatically receives from third party system assigned installer, with his calendar; automatically notifying user and installer about shipment, asking to select (reschedule) installation time in installer calendar.

In one or more embodiments, the system performs capturing when charging station goes online and also performs capturing user feedback. In one or more embodiments, the system handles uninstall request, schedules uninstallation and performs sending to refurbishing facility.

In one or more embodiments, there is provided a charging scheduler, which automatically combines and enables visualizing of the charging schedule. The scheduler allows to edit most efficient charging schedule depending on several parameters, including, without limitation: 1 household use; 1 EV; Multiple EVs; schedule available for revenue generation: shared charger; DR events.

In one or more embodiments, the scheduler provides a complex tariff support, which may include several tiers.

In one or more embodiments, the system provides an energy cap support, based on charging as a service subscription selected (each subscription having its limitations) and user preferences, including, without limitation, user tariff, preference for faster charging, preference for clean energy usage and the like. In one or more embodiments, the system supports the clean energy settings that allow user to select the type of clean energy that the user desires.

In one or more embodiments, the system further incorporates a charging controller, which performs charging commands communication to charging stations according to a charging schedule.

In one or more embodiments, the system further incorporates a sharing module.

In one or more embodiments, the system further incorporates an advertising module, which is configured to automatically publish advertisements.

In one or more embodiments, the system is configured to calculate price to share depending on owner tariff and meter for household and to further schedule DR events.

In one or more embodiments, the system is configured to enable metering for tax deduction purposes in order to provide end of the year information on the amount of funds spent and the generated amount of revenue.

In one or more embodiments, the system may additionally incorporate a warranty module. In one or more embodiments, the system is configured to provide health reporting mechanism on the used hardware. In one or more embodiments, the system is configured to proactively predict EV charging stations that are close to failure state, to replace them before user is impacted.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in systems and methods for electric vehicle charging. It is intended that the specification and examples be considered as exemplary only, with a true scope and spirit of the invention being indicated by the following claims.

What is claimed is:
1. A method for managing charging service comprising independent installers, independent utilities, independent electric charging customers, CO2 levels, and independent energy markets, the method comprising:

a. electronically calculating cost of service on a periodic basis based on a plurality of dynamically changing influencing parameters;
b. electronically determining a capital cost of an installation;
c. obtaining a customer's zip code to determine regional variations in the installation cost;
d. estimating a customer's location from a customer's IP address to determine regional variations in the installation cost;
e. soliciting information about conditions at an installation location which may affect the installation cost by soliciting a customer input in response to an online questionnaire;
f. soliciting an address of the installation location, then obtaining data comprising an age of a building, a size of the building and a number of units from publicly available data bases, to determine the installation cost;
g. inferring from the age of the building an adequacy of an electrical service from an electrical grid to accommodate additional demand which will result from the installation of a charger and whether the installation of the charger will necessitate an upgrade in the electrical service from the electrical grid, a new, larger electrical panel, or both;
h. advising a customer about a possible addition of photovoltaic generation, with or without battery storage; and
i. upon the installation of the charger necessitating the upgrade in the electrical service from the electrical grid in response to the charging being uncontrolled, with attendant higher installation cost, avoiding the upgrade by dispatching charging in real time only during periods when the demand elsewhere in the customer's location has abated;

wherein the customer and the installer are automatically notified about a shipment in response to the charger being shipped to the customer; and wherein the customer is requested to select an installation date and time in an installer's calendar.

2. The method of claim 1, further comprising performing the steps a. through i using a cloud-based platform for controlling charging.

3. The method of claim 1, further comprising performing the steps a. through i using a customer's WiFi connection to a cloud-based platform.

4. The method of claim 1, further comprising performing the steps a. through i using a cellular-based connection to a cloud-based platform.

5. The method of claim 1, further comprising notifying the customer about a scheduling behavior of the charger.

6. The method of claim 1, further comprising advising the customer about how to change a scheduling behavior of the charger.

7. The method of claim 1, further comprising performing the steps a. through i without overloading the electrical grid.

8. The method of claim 1, further comprising matching of the installation conditions with a limited number of pre-determined sets of conditions.

9. The method of claim 1, further comprising pre-determined installation costs that correspond to pre-determined sets of conditions.

10. The method of claim 1, further comprising varying the installation costs based on regional variations in overall construction costs.

11. The method of claim 1, further comprising obtaining an identity of a customer's electric service provider by soliciting from the customer through an online question or by inferring from the customer's zip code or address.

12. The method of claim 1, further comprising determining from publicly available information an availability of subsidies or incentives from a customer's electric service provider, public agency, or other source that may be used to reduce the net installation cost.

13. The method of claim 1, further comprising offering the customer an option of paying in full for a bundled installation cost and the charger.

14. The method of claim 1, further comprising offering the customer an option of making a periodic payment as a subscription to charging as a service, rather than paying in full.

15. The method of claim 1, further comprising determining an amount of a periodic payment electronically, by applying an algorithm to the total bundled cost of installation and the charger.

16. The method of claim 15, further comprising adding thereto operating costs.

17. The method of claim 15, further comprising subtracting therefrom, future revenues from a sale of electrical grid commodities, environmental attributes.

18. The method of claim 1, further comprising providing for a manual verification of the installation conditions obtained electronically.

19. The method of claim 1, further comprising repeating an electronic calculation loop comprising the steps a. through i. in response to the conditions being varied.

20. The method of claim 1, further comprising electronically making receiving request to install charging station, DR event or utility program.

21. The method of claim 1, further comprising providing an electronic access to charging and an energy schedule.

22. The method of claim 21, further comprising determining a fee for the electronic access.

* * * * *